Aug. 28, 1956   P. E. BERRY ET AL   2,761,099
INTERMITTENTLY OPERATED MOTOR FOR CAMERA
Filed Feb. 5, 1951

Paul E. Berry
Raymond F. Anderson
INVENTORS

BY Browning & Simms

ATTORNEYS

United States Patent Office 2,761,099
Patented Aug. 28, 1956

2,761,099

INTERMITTENTLY OPERATED MOTOR FOR CAMERA

Paul E. Berry and Raymond F. Anderson, Houston, Tex., assignors of one-fourth to Will F. Wilson and one-fourth to Earl F. Simmons, Jr., Houston, Tex.

Application February 5, 1951, Serial No. 209,494

10 Claims. (Cl. 318—443)

This invention relates to a means for automatically actuating a camera or other device at regular intervals. In still another of its aspects, it relates to an automatically actuated keying circuit adapted to energize a second circuit at regular but adjustable intervals. In still another of its aspects, it relates to a means for automatically re-actuating such a keying circuit when a predetermined condition exists in the circuit energized by said keying circuit.

It is often desirable to automatically actuate at regular intervals a device such as a camera in order that such device can be operated over a period of time without attention. For example, a motion picture camera can be mounted to view a safe and to take a series of pictures thereof in order to furnish a means of identification of unauthorized persons attempting to enter the safe. Further, it is often desirable that such camera be mounted over an area in which a determination is to be made of the movement of persons or merchandise, such as is in a department store, to determine the reason for lack of sales in a particular department. However, in such operations, it is advantageous to not run the camera continuously in order to limit the amount of film consumed inasmuch as a series of pictures taken periodically will serve the intended purpose and yield the desired information. Hence, there is a need for a camera which can be automatically operated to take a sequence of pictures at regulated intervals without any substantial attention.

It is an object of this invention to provide an apparatus for automatically taking pictures of any desired object or objects at predetermined intervals whereby a record can be made of the condition of such objects at such intervals.

Another object of this invention is to provide an apparatus for actuating a current responsive means such as a camera at periodic intervals by means of an electronic circuit adapted to transmit pulses of current at adjustable intervals, said pulses being terminated responsive to the operation of said current responsive means.

A further object is to provide an auxiliary apparatus adapted to reactivate said electronic circuit when said current responsive means fails to do so.

It is another object of this invention to provide an apparatus for actuating a current responsive apparatus such as a camera by means of electrical pulses wherein said pulses are transmitted by an electron discharge device in response to the accumulation of a charge on a capacitance, the rate of said accumulation being adjustable.

Still another object of this invention is to provide a means for transmitting pulses of current including an electron discharge means controlled by a charge on a capacitance, and also including a means for charging said capacitance at a controlled rate, and means for discharging said capacitance responsive to said pulses of current whereby the time interval between said pulses of current can be controlled.

Yet another object of this invention is to provide an apparatus for transmitting a pulse of current, after a lapse of a predetermined time interval, including an electron transmitting means controlled by the charge on a capacitance, and means for charging such capacitance at a controlled rate and a means for discharging said capacitance responsive to said pulse of current.

Still yet another object of this invention is to provide an apparatus for automatically transmitting pulses of current at intervals of adjustable periodicity, and an auxiliary apparatus adapted to reactivate said first apparatus after a predetermined lapse of time during which said first apparatus has failed to operate.

Other objects, advantages and features of this invention will be readily apparent to one skilled in the art upon a consideration of the written specification taken in conjunction with the attached drawing wherein there is shown schematically a preferred embodiment of this invention.

In discussing the apparatus of this invention and its operation, it is intended that the flow of current shall be construed as being from a point having a greater negative potential to a point having a lesser negative or a positive potential.

In general the apparatus of this invention includes a current responsive means such as a movie camera which it is desired to periodically actuate and means for actuation thereof. The latter can be a current transmitting means such as a vacuum tube controlled by an electrical potential impressed upon a capacitance. The charge on the capacitance can be increased or decreased at a controlled rate by providing a resistance path, variable if desired, therefrom. The capacitance can be returned to its normal potential by a circuit responsive to the current transmitted by the current transmitting means, thereby also returning the current transmitting means to its original status. Should the capacitance fail to actuate the current transmitting means for a predetermined period of time, there can be provided a second capacitance with a current path therefrom which is adapted to actuate said current transmitting means to again return the first capacitance to an operating status. The second capacitance is so constructed and ararnged that it will be periodically returned to its original potential when the first capacitance is functioning properly and will actuate the current transmitting means only when the first capacitance has failed to do so.

Referring now to the drawing, there is shown a current responsive camera motor 1 having a motor shaft 2 carrying a gear 3 adapted to mesh with another gear 4 which can have a cut-out portion 5 and thereby be adapted to act as a camera shutter. Also meshing with gear 3 is a third gear 6 carried on a shaft (not shown) common to the cam 7.

A driving means for the camera which can be a source of current such as a 110 volt, 60 cycle alternating current, is connected to switch 9 by means of wires 10 and 11. Also connected to this source of current can be a twenty-four hour clock 12 having adjustable clips which can be set at different time settings in order to actuate switch 9 at any desired time. The clock is so constructed that it will turn the switch into a closed position at a predetermined time and also open it at a predetermined time. The opposite poles of switch 9 are connected through wires 13 and 14 and a control means including switches 13a and 14a to a primary winding 15 of transformer 16. That portion of the secondary winding of transformer 16 designated as 17 furnishes current through wires 18 and 19 to the field coil of the camera motor. That portion of the secondary winding designated as 20, plus the portion designated as 17 furnishes current to the armature of the camera motor through wires 19 and 21. In this manner, the camera motor will be actuated whenever the primary winding 15 of transformer 16 is energized.

A source of direct current which can be a power supply unit adapted to convert 110 volt, 60 cycle alternating current into a substantially direct current is generally designated by the numeral 22. As shown in the drawing, this power supply can be comprised of a full-wave center-tap rectifier employing a transformer 23 connected in parallel with the source of current flowing in wires 13 and 14. Full-wave rectifier tube 24, which can be a twin plate diode, has its plates connected to opposite ends of secondary winding 25, as shown. A low voltage secondary winding 26 can be employed to furnish current to heat the filament of tube 24. Secondary winding 25 is tapped at its center by wire 27 through which the rectified current flows from the power supply. The cathode heater circuit is tapped by wire 28 having a resistance 29 interposed therein. A capacitance 30 is connected between output wire 27 and a tap on resistance 29 in order to filter the current from tube 24 and thereby produce a rippling direct current. That portion of resistance 29 designated as 29a also helps to filter the current by cutting off the peaks of the direct current pulse. The overall resistance 29 completes the circuit of the direct current power supply.

In accordance with this invention, there is provided an automatic keying circuit adapted to transmit or produce a pulse of current at fixed but variable intervals of time. Thus, there is provided an electron transmitting means or discharge device adapted to transmit current responsive to a potential or a change in potential. This can be a twin triode tube designated as 32. The plates of tube 32 are connected together by wire 33, and thence to a control means such as relay coil 34 by wire 35. The other end of relay coil 34 is connected by means of wire 36 to a tap on resistance 29. The cathodes of tube 32 are connected by means of wires 37 and 38, respectively, and wire 39 to a tap on resistance 29 to complete the plate-cathode circuit. In this manner, the proper potential between the cathodes and plates of tube 32 is provided. This potential must render the plates positive with respect to the cathodes.

A means for impressing a potential on the electron transmitting or discharge means, e. g., tube 32, can include a grid 40. This grid is connected to output line 27 of the power supply by means of wire 41. Interposed in wire 41 is a capacitance 42 adapted to change the potential impressed on tube 32. A second capacitance 43, which is desirably of larger capacity than capacitance 42, can be connected in parallel thereto through switch 44, as shown in the drawing. A resistance 45 is also inserted in the circuit between capacitance 42 and/or 43 and grid 40 to slow the flow of current to and from the grid. A low voltage secondary winding 46 can be employed to supply current to the heating elements of tube 32.

A means for changing the charge on capacitance 42 (and 43) can be a variable grid leak adapted to cause capacitance 42 and, when employed, capacitance 43, to become charged at a controlled rate is connected between grid 40 and a point more positive than said grid to thereby reduce the potential impressed on grid 40 to permit tube 32 to transmit current through the plate-cathode circuit. This grid leak is provided by connecting resistance 47, which can be of substantially the same value as the resistance existing between the plate tap and the cathode tap on resistance 29, in parallel with resistance 29 across the plate circuit. A time interval switch 48 can be provided to tap off varying voltages from resistance 47. This switch can comprise a multi-tap selector switch adapted to tap resistance 47 at different points therealong. A resistance 49 which can be of relatively higher resistance than resistance 45 is connected between the selector switch 48 and the grid 40, as shown in the drawing. In this manner, capacitance 42 (and 43) can be charged by permitting current to pass through resistance 49 and the resistance tapped from resistance 47 and thence through wire 36 back to the power supply.

A means for discharging capacitance 42 (and 43) is provided by connecting one plate of the capacitance via wire 50 to contact point 51 of switch 52 and then connecting the other contact point 53 by means of wire 54 (and 19) to the opposite plate of capacitances 42 and 43. Thus when switch 52 is closed, the opposite plates of the capacitances will be connected together. A low resistance 55 can be provided to prevent scorching and pitting of contact points 51 and 53.

In accordance with one aspect of this invention, an auxiliary circuit is provided which is adapted to actuate camera motor 1 after a predetermined time has elapsed since the above described keying circuit has last actuated the motor. It is contemplated that this auxiliary circuit shall actuate the camera motor should the latter be stopped in such a position that switch 52 is maintained in a closed position by cam 7. This auxiliary circuit comprises an electron discharge or transmitting means adapted to transmit current responsive to a potential and which can be biased to a non-current transmitting condition by an electrical potential and being further adapted to transmit current when such potential is reduced. This means can be a triode type vacuum tube combined in the same envelope as part of tube 32, as shown in the drawing. The plate-cathode circuit for this tube has been described above. A means for impressing a potential on this device can be a grid 56 connected in series with the power supply through resistance 57, wire 58, points 59 and 60, capacitance 61 and wire 62. A grid leak for changing the charge on capacitance 61 can comprise a resistance 63 connected to a tap on resistance 29 intermediate the plate and cathode taps by means of wire 64. A resistance 65 can be connected to contact point 59 and to wire 58 as shown in order to cut down the amount of current going to ground when contact point 59 is made with respect to contact point 66. This resistance is shunted when contact points 59 and 60 are made. A means for discharging capacitance 61 is provided by connecting resistance 67 by wires 68 and 69 to points 66 and 59 to thereby connect the plates together when these points are made.

In discussing the operation of the apparatus of this invention, let it be assumed that it is desired that the camera be situated to view a safe and that it is further desired that the camera take a picture of the safe every minute during the hours of 5:00 p. m. to 9:00 a. m. Clock 12 can be adjusted to close switch 9 at 5:00 p. m. and to open it again at 9:00 a. m. When 5:00 p. m. arrives and switch 9 is closed, current will be turned into transformer 23 thereby energizing the secondary coils thereof. Current will flow from the cathode of tube 24 to the plates and out through the center tap wire 27 and then back through wire 28 and resistance 29 to complete the circuit. Capacitance 30 will smooth the pulsating direct current from tube 24. The higher peak voltages of the half waves of direct current will charge the capacitance which will then feed such charge back to the circuit during the low voltage portion of the direct current pulse. Also, resistor 29a will cut off the peaks of the direct current pulse, thereby furnishing a substantially constant direct current. A voltage potential of proper value is impressed between the plates and cathodes of tube 32 through wires 36 and 39 connected across resistor 29 in such a fashion that the plates will be positive with respect to the cathodes. A potential impressed by the power supply through line 41 and capacitance 42 on grid 40 makes it negative with respect to the cathode associated therewith because the cathode is connected to resistor 29 at a point such that a portion of the resistance between this connection and the output of the power supply provides a desired negative bias for grid 40. This negative bias should be of sufficient value that when applied to grid 40, the tube will be cut off, that is, no current will flow therethrough. Resistance 45 prevents a surge of current to and from grid 40.

Selector switch 48 can be set at any desired point to tap off any portion of the resistance 47 and thereby provide the desired amount of resistance in the grid leak circuit from grid 40 back to the plate circuit of the tube. Resistance 49 which can be of comparatively high value as compared to resistance 45 is provided in series with the resistance tapped off resistance 47 in order that the charging time of capacitance 42 can be slowed to a desired extent. Without this resistance, it would be necessary to increase the resistance values picked off of resistor 47 and this would make calibration and variation of the timing circuit difficult. Current will flow from capacitance 42 out through resistance 49 and that portion of resistance 47 selected by the selector switch and thence out through line 36 back to resistor 29. The rate at which such current flows can be varied by changing the amount of resistance tapped off by selector switch 48 from resistance 47. The greater the resistance tapped off resistance 47, the lesser will be the rate of current flow through the grid leak. Thus, the charging time of capacitance 42 can be varied. As current leaks off from capacitance 42 through resistance 49 and 47, the charge on grid 40 will become less negative with respect to the cathode until a voltage differential thereacross is reached which will permit tube 32 to fire thereby causing a current to flow through line wire 35 and relay coil 34 which is placed in the plate circuit as the load. As the current flows through relay coil 34, its plunger will close switches 13a and 14a. When switches 13a and 14a are closed, the camera motor will be energized and will rotate, thereby turning the shutter 5 and cam 7. When the cam has rotated sufficiently, switch 52 will be closed thereby discharging capacitance 42. The momentum of the camera motor will carry cam 7 sufficiently far to again open switch 52, thereby again impressing sufficient negative voltage on grid 40 to bias the tube to a shutoff position. After this has occurred, current will no longer flow through the relay coil 34 and switches 13a and 14a will be opened, thereby stopping the motor. This cycle of operation will be repeated at fixed time intervals in accordance with the amount of resistance picked off by selector switch 48 from resistance 47.

When it is desired to slow the time interval of firing of tube 32 and therefore the time interval between the frames of film exposed, switch 44 can be closed thereby placing capacitance 43 in parallel with capacitance 42. It will then take a longer time for the two capacitances to be charged sufficiently to fire tube 32. Thus, in effect, capacitance 43 extends the range afforded by selector switch 48.

In the auxiliary circuit of this invention, a voltage differential is impressed through wire 62, capacitance 61, contact points 59 and 60, wire 58 and resistance 57 upon grid 56 of tube 32. This differential will be sufficiently negative with respect to the cathode associated with grid 56 that the tube will be biased to a cutoff position and no current will flow therethrough. However, with the passage of time, current will slowly bleed off through resistance 63 and wire 64 back to the tap on resistance 29 to thereby permit a charge to gradually accumulate on capacitance 61. As this charge accumulates, grid 56 will become less negative with respect to the cathode associated therewith, and when capacitance 61 has been sufficiently charged, tube 32 will fire through grid 56 and the plate-cathode circuit associated therewith. However, the capacity of capacitance 61 is made sufficiently large and/or resistance 63 is made sufficiently large that the time required for a charge to accumulate on capacitance 61 sufficient to fire tube 32 through grid 56 is longer than that required for a charge to accumulate on capacitance 42 (and 43, when used) sufficient to fire tube 32 through grid 40. Then, when grid 40 fires tube 32, points 59 and 66 will make contact thereby discharging capacitance 61. However, should a voltage fluctuation or other incident happen so that cam 7 is stopped in a position to maintain switch 52 closed, thereby preventing firing of tube 32 through grid 40, then the charge on capacitance 61 will continue to accumulate until tube 32 fires, thereby causing current to flow through relay coil 34 closing switches 13a and 14a to energize the camera motor. At the same time, contact point 59 will also be made with respect to contact point 66, thereby discharging capacitance 61 through wires 68 and 69. Low value resistance 67 prevents scorching or pitting of points 59 and 66 during discharge of capacitance 61. Resistance 65 will substantially decrease the current flowing to ground. Resistance 57 should be sufficiently large that there will be a short time lag before the full negative biasing potential is impressed on grid 56. Immediately after capacitance 61 has been discharged, grid 56 will become biased sufficiently to cutoff tube 32, and the relay plunger will return to its normally open position again making contact between contact points 59 and 60. The cycle will be repeated with a charge building up on capacitance 61 to a value sufficient to cause grid 56 to fire tube 32 to again bump the camera motor to cause it to turn. After a sufficient number of these firings have occurred, the camera motor will be turned to a point that switch 52 will open whereupon the automatic keying circuit can again actuate the camera motor.

As stated above, resistance 47 is connected in parallel with that portion of resistance 29 existing between the plate tap and the cathode tap for tube 32. Thence, should the current flowing in resistance 29 vary to thereby vary the voltage drop thereacross, the voltage drop across 47 will vary in like amount. In this manner, a constantly proportional voltage differential is maintained between the grid 40 and its respective cathode irrespective of fluctuations in voltage between the cathode and the plate.

In a specific example of an embodiment of the apparatus of this invention, transformer 23 is so constructed that the secondary winding 25 steps up the input 110 volt voltage to 480 volts, and since this is a center tap type rectifier, output from tube 24, which can be a 5Y3 type tube, is 240 volts of direct current. In this example, the other elements were sized as follows:

| Condenser: | Microfarads |
|---|---|
| 30 | 30 |
| 42 | .25 |
| 43 | 2 |
| 61 | 6 |

| Resistance No.: | | |
|---|---|---|
| 45 | megohms | 22 |
| 49 | do | 66 |
| 55 | ohms | 1,000 |
| 57 | megohms | 44 |
| 67 | ohms | 68,000 |
| 65 | megohms | 22 |
| 63 | do | 144 |

The cathode tap of resistance 29 (line 39) should be so adjusted that approximately a 30 volt differential exists between that tap and wire 28. Also, the tap of resistance 29 by wire 64, which leads to contact point 60, should be situated such that there exists a differential of approximately 40 volts between such tap and wire 28. The plate tap of resistance 29 (wire 36) should be so adjusted that the differential between this tap and the cathode tap (wire 39) is approximately 230 volts. Likewise, resistance 47 should have a normal resistance sufficient to afford a differential thereacross of 230 volts. Tube 32 can be a 6SN7 type tube. Transformer 16 can be sized according to the specific camera motor which is to be employed therewith in a manner well known to those skilled in the art. When the apparatus of this invention is constructed with units of the sizes as set forth above, it has been found that a 16 mm. movie camera can be satisfactorily operated to take pictures intermittently at spaced periods of time therebetween for many desired purposes.

The apparatus of this invention is substantially foolproof and except for a power input failure, will continue to operate as long as it is desired despite voltage fluctuations. Thus, it is apparent that should the camera motor be turned only a portion of the desired number of revolutions in such a manner that the cam 7 maintains switch 52 in a closed position, the auxiliary circuit will automatically energize the camera motor after a suitable period of time has elapsed to cause it to turn and thereby open switch 52. Hence, it is not necessary to continually supervise the operation of the camera, and the only care that need be exercised is to replace the film in the camera with new film after the old has all been exposed. When a sufficiently long reel of film has been placed in the camera, it will be possible to have the camera in operation over long periods of time without any attendance thereto.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus which comprises, in combination, a camera adapted to be actuated by a source of electric current, a normally open relay for controlling said source of current, an electron discharge means having a plate-cathode circuit connected to said relay to close same when current is flowing in said plate circuit, a first grid for controlling said plate-cathode circuit, said first grid being connected in series with a first capacitance to a source of current having sufficient negative potential for biasing said first grid to normally prevent flow of current in said plate-cathode circuit, a resistance connected in parallel across said plate and cathode, a grid leak comprising a means for tapping said resistance at a point along its length and connecting said point to the circuit between said first grid and said first capacitance whereby the negative biasing potential imposed on said first grid with respect to said cathode is gradually decreased by the current leakage through said grid leak until said plate-cathode circuit is energized to thereby close said relay and actuate said camera, a switch connected across said capacitance and adapted to be closed by said camera to discharge said capacitance, and supplementary means for actuating said camera should the latter hold such switch closed longer than a predetermined time comprising a second grid for controlling current flow in a plate-cathode circuit connected to said relay, said second grid being sufficiently biased through a second capacitance in series therewith to normally prevent flow through the last said plate-cathode circuit when said relay is in open position, a grid leak for said second grid adapted to charge said second capacitance and thereby decrease the potential between said second grid and last said cathode to cause current to flow through said relay thereby actuating said camera to open said switch and means for discharging said second capacitance when said relay is closed.

2. The apparatus of claim 1 wherein said second capacitance and said grid leak for said second grid are of such size as to decrease the negative biasing potential of said second grid at a slower rate than that at which the negative biasing potential of said first grid is decreased by said first grid leak and first capacitance.

3. An apparatus which comprises, in combination, a device adapted to be actuated by a source of electrical current, a means for controlling said source of current, an electron discharge means adapted to be biased to a non-current flowing condition by a potential impressed thereon and being further adapted to transmit current when said potential is changed, an operable connection between said source controlling means and said electron discharge means, a means for impressing said potential upon said discharge means including a capacitance connected in series with said discharge means, a means for changing the charge on said capacitance at a controlled rate, a means actuated by said device for returning the charge on said capacitance to its original potential, and an auxiliary means for actuating said device after a predetermined time has elapsed without it having been actuated by said electron discharge means which comprises a second electron discharge means operably connected to said source controlling means, a second means for impressing a potential upon said second electron discharge means including a second capacitance connected in series with said second electron discharge means, and a means for changing the charge on said second capacitance at a controlled rate whereby said capacitance is charged at a rate slower than said first capacitance.

4. An apparatus which comprises, in combination, a camera adapted to be actuated by a source of electrical current, a normally open relay for controlling said source of current, an electron discharge means having a plate-cathode circuit connected to said relay to close same when current is flowing in said plate circuit, a grid for controlling said plate-cathode circuit, said grid being connected in series with a capacitance to a source of current having sufficient negative potential for biasing said grid to normally prevent flow of current in said plate-cathode circuit, a resistance connected in parallel across said plate and cathode, a grid leak comprising a means for tapping said resistance at a point along its length and for connecting said point to the grid circuit between said grid and said capacitance whereby the negative biasing potential imposed on said grid with respect to said cathode is gradually decreased by current leakage through said grid leak until said plate-cathode circuit is energized to thereby close said relay and actuate said camera and a shunt operable responsive to actuation of said camera to shunt said capacitance to discharge the same while simultaneously providing a connection between said grid and said source of current.

5. The apparatus of claim 4 wherein said shunt is a switch adapted to be closed by said camera to discharge said capacitance and to be opened after a predetermined extent of actuation of said camera.

6. A keying circuit for transmitting current at periodic intervals to actuate an apparatus including transmitting means connected in said circuit to control current flow to said apparatus and adapted to be rendered conductive and non-conductive responsive to the application thereto of potentials of first and second magnitudes respectively, a potential changing means connected to said transmitting means to apply thereto said potentials of said different magnitudes, a switch connected to said potential changing means, said potential changing means and switch being arranged so that after said switch is opened and before it is closed, a potential of said first magnitude is applied to said transmitting means and with the switch closed, a potential of said second magnitude is applied to said transmitting means, and apparatus for opening said switch should it remain in a closed position longer than a predetermined time including a current responsive means for opening said switch and means for transmitting a pulse of current to said current responsive means comprising an electron transmitting means adapted to transmit current to actuate said current responsive means, said electron transmitting means being adapted to transmit current upon a change in one direction of potential applied thereto, a capacitance connected in series with said electron transmitting means and with a source of current whereby the potential of said source can be impressed on said electron transmitting means and a means for changing said potential comprising a resistance connected to said capacitance whereby current can be transmitted to change the charge on said capacitance thereby changing said potential impressed on said electron transmitting means to cause it to transmit a pulse of current.

7. The apparatus of claim 6 wherein a means is connected across said capacitance in such a manner that current from said electron transmitting means actuates said means connected across said capacitance thereby returning said capacitance to its original condition.

8. An apparatus which comprises, in combination, a device adapted to be actuated by a source of electrical current, a switch connected to interrupt flow of current from said source to said device, current responsive means for actuating said switch and a control circuit connected between said current responsive means and a source of current, said control circuit including electron valve means connected therein and adapted to interrupt current flow through said control circuit upon application thereto of an electrical potential of a first value and then permitting flow through the control circuit upon changing said potential to a second value, a timing circuit connecting said electron valve means to a source of potential at least as great as the larger of said values, an impedance in the last-mentioned circuit causing the potential applied from said potential source to said electron valve means to change over a predetermined time interval from one of said first and second values to the other, and means connected to said timing circuit and said device to cause the potential applied to said electron valve means to change from said other value to said one value.

9. The apparatus of claim 8 in combination with a second timing circuit also connecting said electron valve means to a source of potential at least as great as the larger of said values, an impedance in the second timing circuit causing, over a time interval of longer duration than the first mentioned time interval, the potential applied from the last-mentioned potential source to said electron valve means to change from said one value to the other value, and means connected to said control circuit and actuated responsive to current transmitted through said control circuit to cause the potential applied by second timing circuit to change to said one value.

10. An apparatus for producing pulses of current at predetermined time intervals which comprises, in combination, current responsive means adapted to be actuated by a source of electrical current, an electron valve means connected between said current responsive means and said source of current and adapted to be biased to a non-current transmitting condition by an electrical potential applied thereto, a capacitance connected to said valve means in series with a source of potential sufficient to bias the valve means to a non-transmitting condition, a resistance connected between said capacitance and a point having a different potential than that of said source of potential to permit a regulated flow of current to charge said capacitance thereby changing the potential applied to the valve means to permit it to transmit current and actuate said current transmitting means, switch means connected across said capacitance to discharge the latter when the switch means are closed, said switch means being connected to said current responsive means so as to be closed by the current responsive means upon current flow therethrough, and means connecting between said source of potential and said valve means and including said switch means therein so that closing of said switch means connects said source of potential to said valve means to bias it to non-transmitting condition.

References Cited in the file of this patent
UNITED STATES PATENTS

| | | |
|---|---|---|
| 1,792,296 | Given | Feb. 10, 1931 |
| 2,061,011 | Vingerhoets | Nov. 17, 1936 |
| 2,149,471 | Shore et al. | Mar. 7, 1939 |
| 2,156,440 | Veber | May 2, 1939 |
| 2,265,290 | Knick | Dec. 9, 1941 |
| 2,279,007 | Mortley | Apr. 7, 1942 |
| 2,346,079 | Newton | Apr. 4, 1944 |
| 2,350,797 | Morland et al. | June 6, 1944 |
| 2,371,981 | Few | Mar. 20, 1945 |
| 2,539,123 | Dudley | Jan. 23, 1951 |
| 2,614,239 | Smith et al. | Oct. 14, 1952 |